Aug. 8, 1939.  C. J. LEMONT  2,169,102
POLE-SNUBBING DEVICE
Filed July 15, 1937
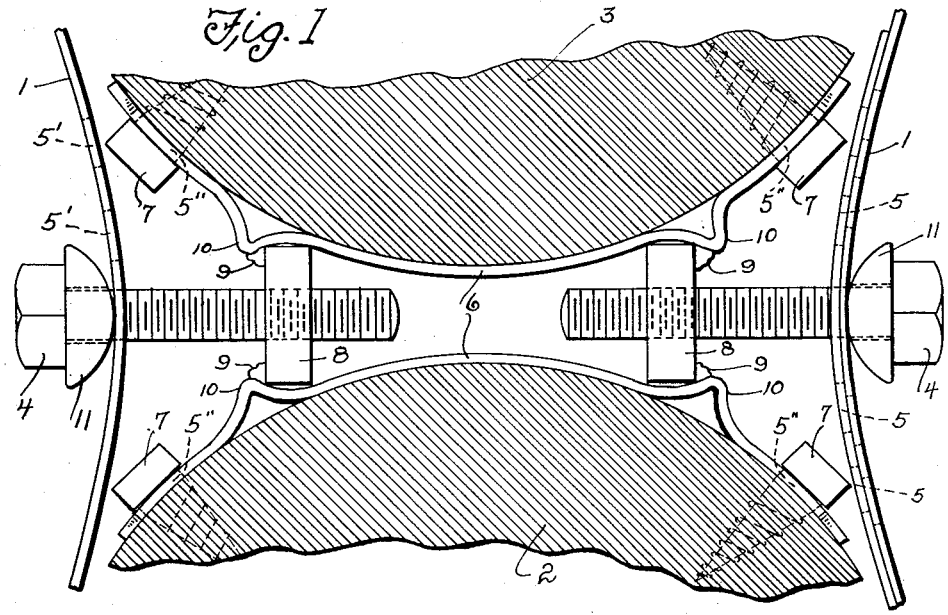
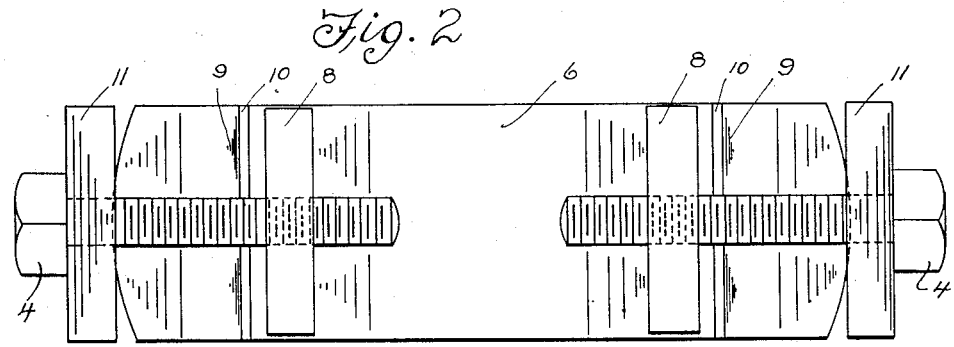
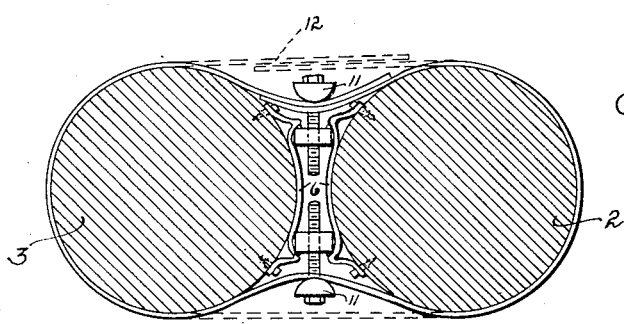
INVENTOR.
Clarence J. Lemont
BY
Chester W. Brown
ATTORNEY.

Patented Aug. 8, 1939

2,169,102

UNITED STATES PATENT OFFICE 2,169,102

POLE-SNUBBING DEVICE

Clarence J. Lemont, South Milwaukee, Wis., assignor to Line Material Company, South Milwaukee, Wis., a corporation of Delaware Application July 15, 1937, Serial No. 153,770

5 Claims. (Cl. 20—99)

This invention relates to improvements in pole snubbing devices.

The general object of this invention is to provide a clamping and snubbing device for rigidly securing a stub pole to a supporting pole, such as a line pole, when the latter has been materially deteriorated at its base end and is likely to fall.

More specifically, it is an object of this invention to provide a pole snubbing and clamping device comprising a saddle upon which the pole and the stub pole are seated, a band encircling both poles, and a pair of tensioning stud bolts threadedly engaging the saddle, thereby equalizing the tension of the band at opposite ends of the saddle and opposite sides of the pole.

A further object is to provide a saddle comprising a pair of spaced arcuate saddle straps secured to a pair of spaced saddle blocks which serve as clamping plates cooperating with the tensioning stud bolts and correlated with the saddle straps to insure that tensioning forces tending to rupture the device will be counteracted by compressive forces exerted upon the saddle when the poles are clamped thereto by means of the band.

In the drawing:

Fig. 1 is a fragmentary transverse sectional view of a pair of poles secured to the device hereafter described.

Fig. 2 is a view in side elevation of the device shown in Fig. 1, a portion being removed to show parts otherwise concealed.

Fig. 3 is a full view similar to Fig. 1 on a reduced scale.

Like parts are identified by the same reference characters throughout the several views.

In the embodiment of this invention represented in the drawing, the device comprises a pair of substantially rectangular elongated arcuately-shaped guide plates 6 apertured at their ends 5" to receive fastening lag screws or bolts 7 threaded into the sides of the stub pole 2 and the pole 3.

The plates 6 are each shaped to conform to the general outline of the poles 2 and 3 and are in direct contact with a portion of the poles except for the folds 10 which are formed in the plates 6 to provide anchoring or seating means for the bracing blocks 8. The bracing blocks 8 are permanently secured to the seats or folds 10 of the plates 6 by fastening means 9. These fastening means 9 may vary according to the desires of the user, but it is preferred to weld the block to the plates as illustrated because such forms a very sturdy connection and is comparatively inexpensive to use.

The bracing blocks 8 are in effect nuts threaded for receiving the tension bolts 4 adapted to draw the band 1 inwardly between and about the poles.

In order to further strengthen and support the pole 3, I provide a band 1 which encircles the major portions of the poles 2 and 3. The band 1 is provided with bolt-receiving openings or apertures 5 in the end portions of the band and medially of the band margins. The band is also provided with apertures 5' intermediate its ends. These apertures 5 and 5' are so arranged that, when the band 1 has been mounted in its operative position encircling the poles 2 and 3, they will align with the blocks 8, and the apertures 5 in the overlapping ends of the band may be aligned with each other. When thus aligned, the bolts 4 may then be passed through the proper apertures 5 and 5' and engaged with the blocks 8 as shown.

It is preferable, in carrying out the spirit of this invention, to provide two of the tensioning bolts 4 in opposed relation to each other and positioned relative to the plates 6 so that they are disposed between the poles 2 and 3.

In actual practice, the stub pole 2 is first placed in a predetermined position in the ground (not shown) where it may be desired to position the pole 3. One of the arcuately-shaped guide plates 6 may then be fastened to the pole 2 as described and the pole 3 brought into engagement with the other plate 6 for attachment thereto as shown.

After the plates have been secured to the poles 2 and 3, and incidentally, forming the first connection between the poles, the tensioning band 1 is placed about the outer peripheries of the poles with the two ends of the band overlapping each other as shown in Figs. 1 and 3 and the apertures 5 in the ends of the band aligned as previously described. At the same time, the apertures 5' in the center of the band are aligned with the threaded aperture in the other bracing block 8.

After the poles are connected to each other through the medium of the arcuately-shaped plates and the tensioning band, the band assumes a substantially straight-line position between the points of first inner contact between the band and the poles as indicated by the dotted line 12 in Fig. 3.

To perform the snubbing operation, the bolts 4 are inserted in the apertures in the manner heretofore described and washers 11, which are semi-circular in cross-section, are interposed between the head of the bolts and the tensioning band. The bolts 4 are then rotated to cause the band 1 to bow inwardly from the straight position 12, shown in Fig. 3, to the full-line position as illustrated in Figs. 1 and 3. The band is thus drawn into embracing relation to the poles and holds the poles in rigid relationship to each other and to the plates 6.

The best results are obtained if the bolts 4 are alternately turned an equal number of turns until sufficient snubbing action has been attained, thus equalizing the tension upon each bolt, bowing the tensioning band uniformly on each side of the saddle. Substantially the same amount of strain is thereby exerted at the center of the band and at the overlapping ends of the band.

From the foregoing, it will be apparent that a pole snubbing and clamping device has been provided in which the clamping forces of the band counteract the tensioning forces produced by the band upon the saddle and thus inherently add strength to the device when in actual use, in which the tensioning forces exerted by the band upon opposite sides of the saddle may be substantially equalized as the tensioning forces are increased, and which is simple to manufacture and assemble, effective in operation and easily applied.

The invention is susceptible of various changes in its form, proportions and minor details of construction, and the right is herein reserved to make such changes as properly fall within the scope of the appended claims.

I claim:

1. In a pole snubbing and clamping device, a saddle comprising a pair of opposed arcuately-curved plates, each having relatively spaced portions folded inwardly toward the other of said plates, and a pair of relatively spaced spacing blocks disposed between said plates and between the folded portions of each plate, said blocks each being secured to corresponding folded portions of both plates.

2. In a pole snubbing and clamping device, a saddle comprising a pair of opposed arcuately-curved plates, each having relatively spaced portions folded inwardly toward the other of said plates, and a pair of relatively spaced spacing blocks disposed between said plates and between the folded portions of each plate, said blocks each being secured to corresponding folded portions of both plates, in combination with tensioning means associated with each of said blocks.

3. In a pole snubbing and clamping device, a saddle comprising a pair of opposed arcuately-curved plates, each having relatively spaced portions folded inwardly toward the other of said plates, a pair of relatively spaced spacing blocks disposed between said plates and between the folded portions of each plate, said blocks each being secured to corresponding folded portions of both plates, in combination with tensioning means associated with each of said blocks, and a band encircling said saddle and secured to said blocks by said tensioning means.

4. The combination with a pair of adjacent poles, of a pole snubbing and clamping device comprising a pair of opposed arcuately-curved plates, each engaged with a pole and having relatively spaced portions folded inwardly toward the other of said plates, a pair of relatively spaced spacing blocks disposed between said plates and folded portions of each plate, said blocks each being secured to corresponding folded portions of both plates, a band encircling said poles, and tensioning means associated with each of the blocks and tensioning said band about said poles.

5. The combination with a pair of adjacent poles; of a pole snubbing and clamping device comprising a saddle including a pair of arcuately-curved opposed plates extending between said poles from corresponding sides of said poles to the other corresponding sides thereof, a compression block disposed on each of said corresponding sides and between said poles, said blocks being secured to said plates and each having a threaded aperture with its axis extending longitudinally between said plates and transversely of said poles; a snubbing band encircling said poles and saddle and having apertures registering with the apertures in said blocks; and a pair of tensioning bolts each threaded in the apertures in one of said blocks and extending through a corresponding aperture in said band, whereby compressive and tensioning forces exerted by said bolts are substantially equalized.

CLARENCE J. LEMONT.